United States Patent [19]

Crowther

[11] Patent Number: 4,525,816

[45] Date of Patent: Jun. 25, 1985

[54] SONAR ARRANGEMENTS

[75] Inventor: Paul A. Crowther, London, England

[73] Assignee: The Marconi Company Limited, England

[21] Appl. No.: 421,960

[22] Filed: Sep. 23, 1982

[30] Foreign Application Priority Data

Sep. 25, 1981 [GB] United Kingdom ................ 8129090

[51] Int. Cl.³ ................ G01S 3/82

[52] U.S. Cl. ................ 367/123; 367/905

[58] Field of Search ................ 367/123, 905

[56] References Cited

U.S. PATENT DOCUMENTS

| | | | |
|---|---|---|---|
| 3,370,267 | 2/1968 | Barry | 367/123 |
| 3,852,707 | 12/1974 | Autrey | 367/123 |
| 4,003,016 | 1/1977 | Remley | 367/123 |
| 4,060,792 | 11/1977 | van Heyningen | 367/905 |
| 4,233,678 | 11/1980 | Grady | 367/122 |
| 4,301,522 | 11/1981 | Guyot et al. | 367/123 |

FOREIGN PATENT DOCUMENTS

| | | |
|---|---|---|
| 0007864 | 2/1980 | European Pat. Off. |
| 1385709 | 2/1975 | United Kingdom |
| 1385710 | 2/1975 | United Kingdom |
| 1484344 | 9/1977 | United Kingdom |
| 1537972 | 1/1979 | United Kingdom |

*Primary Examiner*—Richard A. Farley
*Attorney, Agent, or Firm*—Kirschstein, Kirschstein, Ottinger & Israel

[57] ABSTRACT

A sonar beam steering arrangement in which a circular array of electroacoustic transducers are sampled in sequence, the samples being digitized and stored serially in a shift register. The register is several cycles long so that samples from all of the 'illuminated' transducers can be stored simultaneously. The various stages have resistance tappings of different values such that a linear broadside array is simulated for a particular transducer at a particular stage in the shift register cycle. As the samples progress through the register each transducer in turn acquires this simulated broadside array and thus provides a narrow beam 360° scan. Interpolation between adjacent transducer 'dead-ahead' direction is obtained by (e.g.) triplicating the shift register and adjusting the weightings slightly from each register to the next.

6 Claims, 3 Drawing Figures

SONAR ARRANGEMENTS

This invention relates to sonar arrangements and particularly to such arrangements for providing a 360° scanning facility.

It has been previously proposed to employ a circular array of electroacoustic transducer elements, each element being omni-directional, to transmit and/or detect acoustic signals under water. Signals received from a particular 'target' source arrive at the various tranducers with delays which vary from a minimum at the nearest transducer, and increasing with the more distant transducers in a non-linear manner.

A shift register associated with each transducer receives a signal sample which can therefore be delayed by an amount dependent upon the length of the register, or the tapping at which the sample is extracted. By adjusting the tapping positions of the different registers therefore, a delay contour can be obtained such as to provide a directional beam. Rotation of the beam can then be obtained by loading a circulating register with all of the signal samples in parallel and connecting the shift registers to a selected group of the circulating register stages.

Such a previously proposed system has certain deficiencies in regard to the accuracy of the delays that are provided, with the result that the beam tends to have side lobe irregularities. It also requires a very large number of transducers to give any very fine resolution of target direction.

An object of the present invention is to provide a digital sonar arrangement giving good beam definition, and resolution of target direction.

According to the present invention a sonar arrangement comprises a circular array of electroacoustic transducers, means for sampling each transducer signal in sequence, means for quantising and producing a digital representation of each signal sample, a shift register arranged to receive a plurality of cycles of each digital representation in sequence, a predetermined selection of stages of said shift register being tapped and provided with tap weightings which, in conjunction with the signal magnitudes available from each transducer in successive cycles of the stored shift register signals, provide a combination output signal for a target direction determined by the particular group of transducers whose signals occupy said predetermined selection of shift register stages at any time.

There is preferably a plurality of the shift registers connected to receive the digital representations of the transducer signals substantially in parallel, the tap weightings of corresponding stages of the shift registers being slightly different so as to bias the effective beam direction from one shift register to another by a fraction of the angle between successive transducers. Thus one shift register may provide a selection of first beam directions aligned with the respective transducers and the remaining shift registers provide beam directions uniformly interpolated between the first beam directions.

A sonar arrangement providing a 360° scan will now be described, by way of example, with reference to the accompanying drawings, of which:

Figure 1:
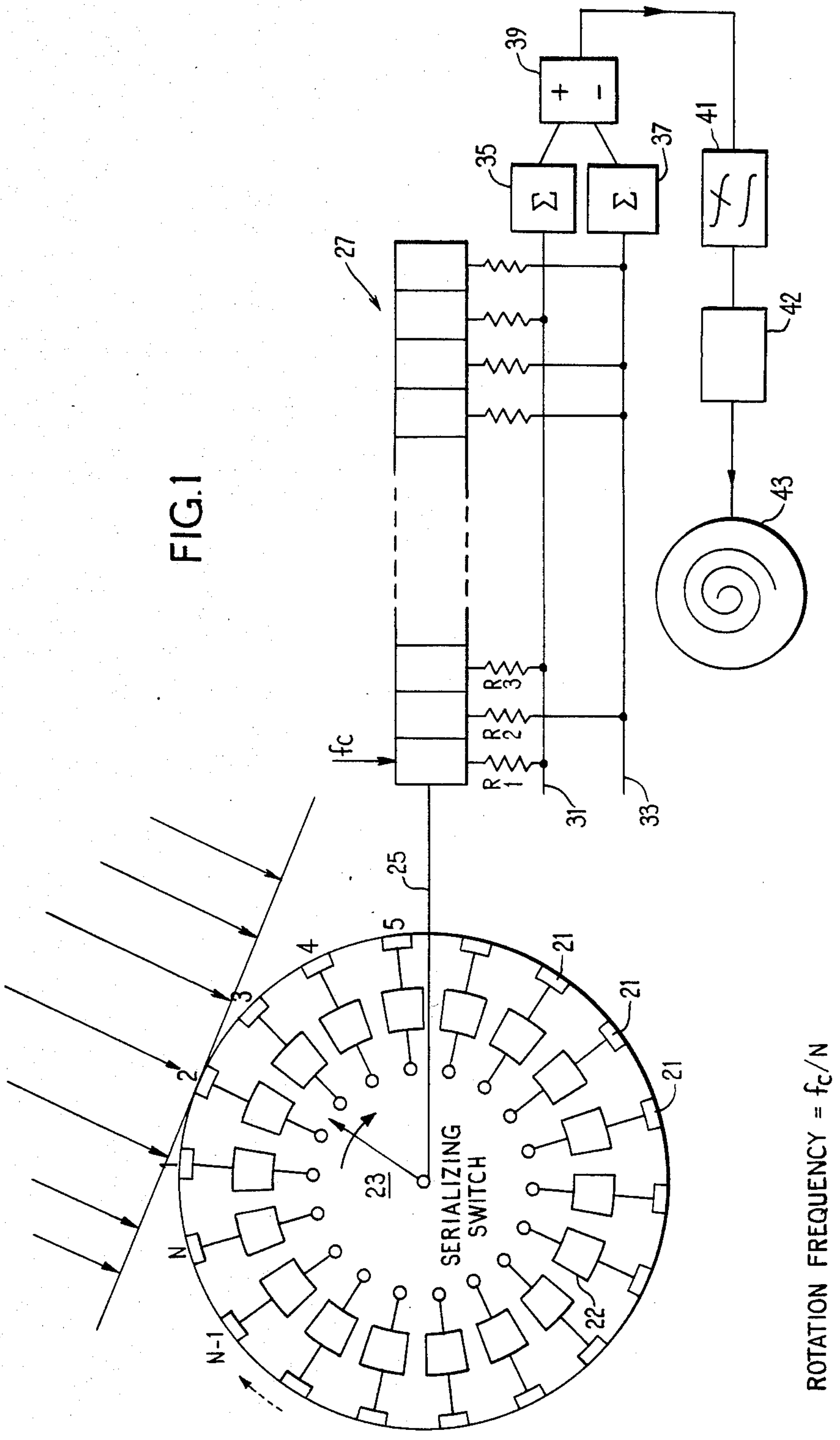
FIG. 1 shows a sonar system diagrammatically.

Referring to FIG. 1, an array of perhaps one hundred electroacoustic transducers 21 form a circle (a smaller number being shown for convenience), each transducer having a wide beamwidth in the plane of the circle and the desired transverse beamwidth in the plane, which would normally be the vertical plane, at right angles to this. The electrical output of each transducer is digitally coded by a respective one-bit coder 22. The two bit values correspond to the positive and negative instantaneous values of the acoustic carrier signal. The coded values, or digital representations, are then sampled as indicated by a rotating contact switch 23. This mechanical switch is merely a diagrammatic illustration for in fact each transducer is connected to a respective electronic switch, for example a field effect transistor, these switches being enabled sequentially to connect the transducer coders 22 sequentially to a common bar shown as the wiper connection 25 of the switch 23. In an alternative arrangement a common coder in the 'wiper' lead 25 may replace the individual coders 22.

The acoustic signal being detected may have a frequency ($f_o$) up to many kilohertz, for example 100 kHz. It is arranged that the period between samples at any one transducer is an intergral number of acoustic signal periods plus or minus a quarter period thus giving quadrature data samples on successive scans. This both ensures that an impression of D.C. is not obtained by coincidental sampling of the same point-on-wave, and also provides a range of instantaneous signal values (even though coded to '1' or '0') for making up to a desired value. Thus, $$f_s = \frac{fo}{(I \pm 1/4)}$$

where $f_s$ is the sampling rate at any one transducer (and thus the switch rotation frequency) and may typically be about 18 kHz. In an actual example $f_o = 83$ kHz; $I = 5$; and $f_s = 17.5$ kHz. Thus 4 $\frac{3}{4}$ cycles of the acoustic signal are received by each transducer between successive samplings.

The electronic switch 23 must in general operate at $Nf_s$ which is thus the sample rate (i.e. the bit rate) at the common connection 25. The one-bit samples (i.e. digital representations) are applied serially to a shift register 27 which is clocked at the same rate $Nf_s$. In the above example this would be 1.75 MHz.

The shift register 27 comprises a number of stages which is sufficient to accommodate several cycles of samples, It is desirable that the first sample derived from the transducer closest to the target, i.e. the 'head-on' transducer, is still in the shift register when the transducers on the diameter transverse to the target direction first intercept the advancing acoustic pulse. In the above case this implies about three cycles of samples and thus about three hundred stages. Such length gives the maximum scope for shaping the response beam.

The acoustic pulse typically has a pulse repetition rate of about one per second and a pulse duration of about 200 microseconds. Such a pulse does produce redundant samples in several cycles of the shift register but these merely produce slight blurring of the beam.

It is the object to bias the levels of the signals received by all (or at least a wide selection) of the 'illuminated' transducers to such values as would be received by a linear broadside array facing the target. Control of the actual received signals is impracticable so the shift register outputs are biased.

Considering each cycle of the shift register, a particular stage, the same in each cycle, is selected for the 'target dead ahead' condition. When the target is dead ahead of the transducer corresponding to this stage in the cycle and the signal sample from that transducer is stored (transitorily) in that register stage, the other stored signal samples would be symmetrically distributed about that stage since they suffer symmetrical travel delays of the acoustic pulse. However, in addition to this (symmetrical) travel delay there is an asymmetry of the stored signal samples due to the scanning time of the switch 23. Both of these effects are predictable, knowing the geometry of the array and the rotational frequency of the switch 23. The selected stages of the register, from all three cycles are thus provided with weighted tapping resistors R1, R2, R3 etc.

In order to acheive the standard signal level of a broadside array certain of the signal samples require suppressing to varying extents and some require boosting. Consequently the two sets of tappings are connected to respective positive and negative weighting lines 31 and 33. These lines are connected to summing amplifiers 35 and 37 the outputs of which are differenced in a differencing circuit 39. The net output at each clock pulse is then applied to a low-pass filter 41, to a detector circuit 42 and then to an intensity modulated cathode ray tube display 43 driven by a spiral timebase system rotation in synchronism at the scan frequency.

As the switch 23 scans around the transducers in synchronism with the stepping of the signal samples through the shift register, each transducer in turn, or rather the signal sample therefrom, will occupy the 'dead ahead' stage in each cycle of the register. The beam formed by the weighted tappings will therefore relate to each transducer in turn and will effect a 360° scan around the array.

Figure 2:
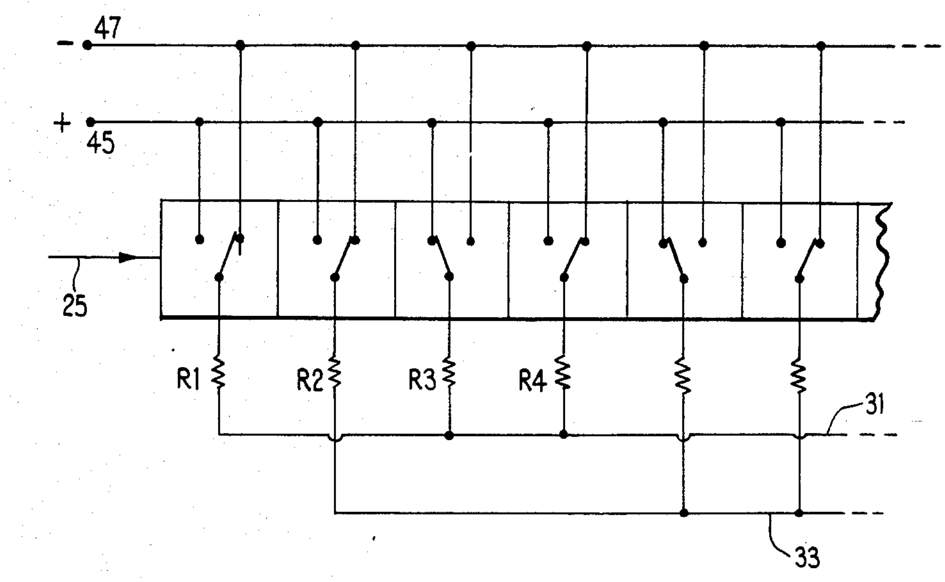
FIG. 2 is a diagram of a detail of the shift register appearing in FIG. 1.

FIG. 2 shows, very diagrammatically, the operation of the shift register 27 and the weighted tappings. Each stage is predetermined as requiring positive or negative weighting and is accordingly connected to a positive or negative supply 45 or 47. Each stage is represented by a switch having an open and a closed condition, the presence of a stored '0' signal value (as coded by the coding circuits 22 of FIG. 1) effectively opening the switch and a '1' closing it. Thus as the coded signal levels step through the register the weighting resistors are connected or not to their predetermined positive or negative supply. The lines 31 and 33 will therefore carry the sums of the register currents.

At each step of the shift register operation, the head-on direction of a particular transducer will be considered for target presence. A target on that particular heading will produce the necessary combination of 1's and 0's to produce a net output and a 'bright-up' of the oscilloscope.

Each pulse transmitted initiates the spiral scan and the time delay for the return of the pulse determines which of the many thousand 'circlular' sweeps of the spiral highlights the target. Both range and direction are thus indicated.

Figure 3:
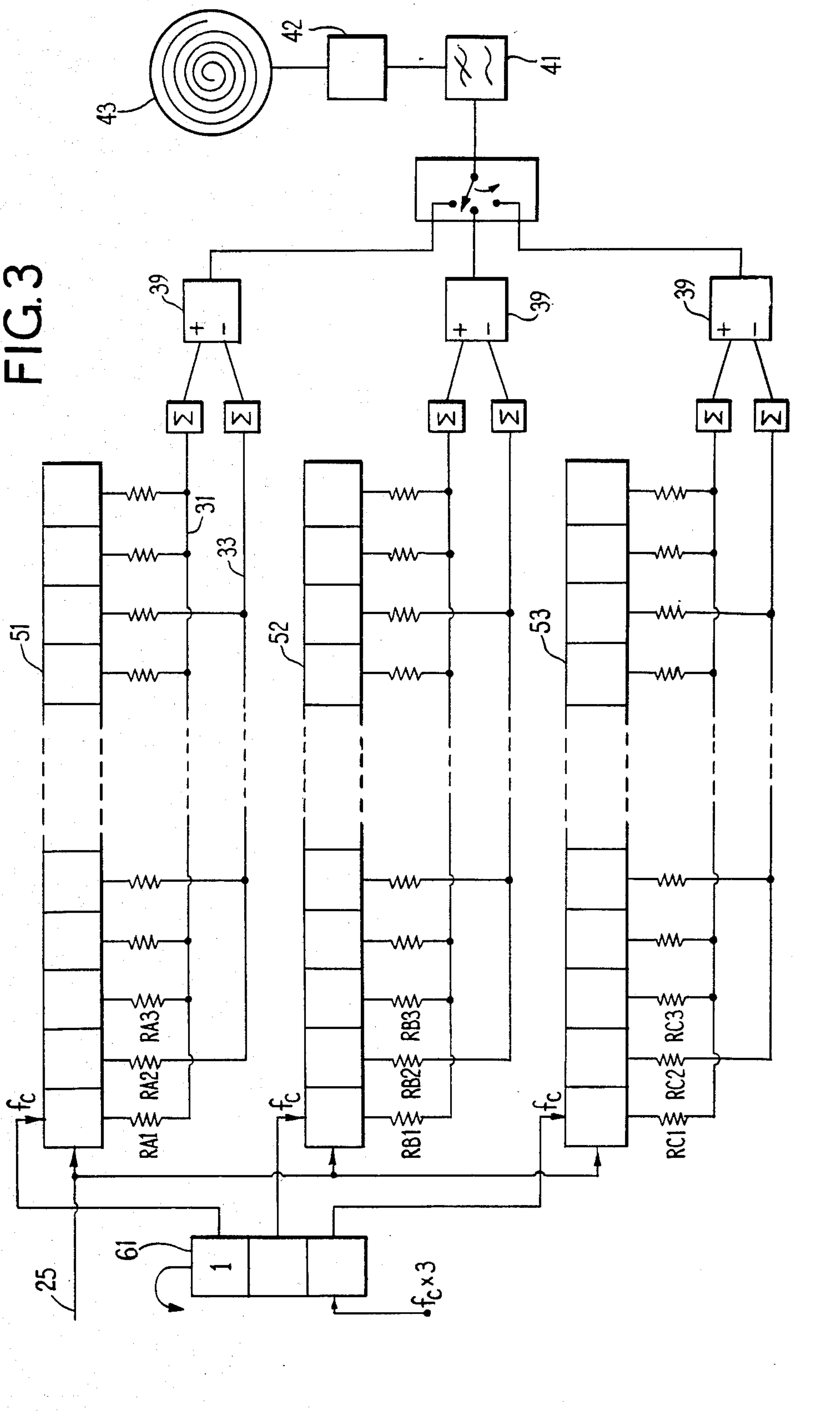
FIG. 3 shows, again diagrammatically, a sonar system modified to provide direction interpolation.

A significant advantage of the invention is the ability to provide finer angular resolution than would normally be provided by the 'N' transducers of the array of FIG. 1. FIG. 3 shows three shift registers 51, 52 and 53 each basically similar to the register 27 of FIG. 1 and each having a similar array of positive and negative weighting resistors RA1, RA2 etc; RB1, RB2 etc; and RC1, RC2 etc.

The registers 51, 52 and 53 are each clocked as before by clock pulses ($f_c$) at the bit rate on line 25, but the three clock pulse signals are staggered regularly. A pulse distributor 61 consists of a 3-stage cycling shift register which is clocked at three times the line 25 bit rate. The output from each stage provides a clock pulse for one of the registers 51, 52 and 53.

The tap weighting resistors RA are the same as those in FIG. 1. Thus outputs from the differencing circuit 39 for register 51 correspond to target directions head-on, i.e. radially outwards, from each transducer. For register 52 however, the weighting resistors are biased slightly off the symmetrical arrangement of register 51. Thus the weightings are increased slightly on one side of the 'head-on' stage and decreased to the other, with the result that the response beam for the array is shifted slightly. The adjustment of the weightings is such that the resulting beam lies one-third of the way between the original beam and that for the adjacent transducer.

The tap weightings for register 53 are adjusted slightly further, taking the beam position one-third of the way from the next transducer.

Thus, between each original output, from register 51, there are two sequential outputs from the other two registers. The result is that the response beam is shifted around the array in angular steps one-third of that of the transducer spacing.

The three outputs, from the respective differencing circuits 39 are OR-gated, filtered and displayed as in FIG. 1.

There may of course be only one, or more than two, intervening steps between each transducer by the provision of appropriate shift registers, weighting resistors and clock pulse generator.

In a modification of the basic coding arrangement the coders 22 may provide two-bit, or finer quantisation.

I claim:

1. A sonar arrangement for generating a rotation directional response beam to an incoming sonar signal comprising:

(a) a circular array of electroacoustic transducers each of which generates an individual electric signal, (b) means for sequentially sampling the signals from said transducers (c) clocking means for quantising the signal samples and producing digital representations thereof, and (d) a shift register arranged to be fed sequentially with digital representations of said signal samples, said shift register being provided with sufficient stages to receive a plurality of cycles of signal samples and being tapped at a predetermined selection of stages with individual positive and negative tap weightings of appropriate magnitude to provide phase compensation of said incoming sonar signal at those transducers whose signal samples instantaneously occupy said predetermined selection of stages over a plurality of cycles of signal samples, and (e) summing means to sum the weighted output signals from said tapped stages and thereby generate said rotating directional response beam.

2. A sonar arrangement according to claim 1, comprising a plurality of said shift registers connected to receive said digital representations of the transducer signals substantially in parallel, the tap weightings of corresponding stages of the shift registers being slightly different so as to bias the effective beam direction from one shift register to another by a fraction of the angle between successive transducers.

3. A sonar arrangement according to claim 2, wherein one shift register provides a selection of first beam directions aligned with the respective transducers and the remaining shift registers provide beam directions uniformly interpolated between the first beam directions.

4. A sonar arrangement according to any preceding claim wherein said means for quantising each transducer signal sample provides a one-bit quantisation, the two bit-values being allotted to positive and negative instantaneous signal values respectively.

5. A sonar arrangement according to claim 1 wherein the period between samples at any one transducer is an integral number plus or minus a quarter of periods of said incoming sonar signals.

6. A sonar arrangement according to claim 2 wherein the period between samples at any one transducer is an integral number plus or minus a quarter of periods of said incoming sonar signal.

* * * * *